US012664772B2

(12) United States Patent
Najafi et al.

(10) Patent No.: US 12,664,772 B2
(45) Date of Patent: Jun. 23, 2026

(54) METHOD AND SYSTEM FOR ENCODING IMAGE DATA IN HYPERDIMENSIONAL COMPUTING SYSTEMS

(71) Applicant: University of Louisiana at Lafayette, Lafayette, LA (US)

(72) Inventors: Mohammadhassan Najafi, Lafayette, LA (US); Mehran Moghadam, Lafayette, LA (US); Sercan Aygun, Lafayette, LA (US)

(73) Assignee: UNIVERSITY OF LOUISIANA AT LAFAYETTE, Lafayette, LA (US)

( * ) Notice: Subject to any disclaimer, the term of this patent is extended or adjusted under 35 U.S.C. 154(b) by 217 days.

(21) Appl. No.: 18/790,902

(22) Filed: Jul. 31, 2024

(65) Prior Publication Data

US 2025/0046074 A1     Feb. 6, 2025

Related U.S. Application Data

(60) Provisional application No. 63/661,167, filed on Jun. 18, 2024, provisional application No. 63/530,034, filed on Jul. 31, 2023.

(51) Int. Cl.
| | |
|---|---|
| *G06V 10/00* | (2022.01) |
| *G06V 10/74* | (2022.01) |
| *G06V 10/94* | (2022.01) |
| *G06V 10/764* | (2022.01) |
| *G06V 10/776* | (2022.01) |

(52) U.S. Cl.
CPC .......... G06V 10/955 (2022.01); G06V 10/761 (2022.01); *G06V 10/764* (2022.01); *G06V 10/776* (2022.01)

(58) Field of Classification Search
None
See application file for complete search history.

(56) References Cited

U.S. PATENT DOCUMENTS

| | | | | |
|---|---|---|---|---|
| 6,370,270 B1 * | 4/2002 | Nair | ........................ | G06T 7/248 |
| | | | | 382/209 |
| 2020/0401376 A1 * | 12/2020 | Najafi | ........................ | G06F 7/70 |
| 2021/0327376 A1 * | 10/2021 | Srinivasa | ............. | G06V 10/764 |
| 2022/0156535 A1 * | 5/2022 | Hiromoto | ............ | G06V 10/768 |

* cited by examiner

*Primary Examiner* — Joseph R Haley
(74) *Attorney, Agent, or Firm* — Ted M. Anthony; Sarah B. Dupont

(57) ABSTRACT

A method and architecture for encoding image data solely based on pixel intensities, eliminating the need for encoding pixel positions. This is achieved by utilizing low-discrepancy (LD) sequences, such as Sobol or Van Der Corput (VDC) sequences, for deterministic encoding of the image intensity values. The position hypervectors, which were previously required for representing pixel positions, are no longer needed. The corresponding index of the LD sequence is used to encode the intensity values.

16 Claims, 8 Drawing Sheets

| D | Encoding | Accuracy | | |
|---|---|---|---|---|
| | | Minimum | Average | Maximum |
| 256 | Random | 67.36% | 69.24% | 71.70% |
| | Sobol | | 79.03% | |
| 512 | Random | 82.32% | 83.03% | 83.83% |
| | Sobol | | 89.47% | |
| 1,024 | Random | 90.27% | 91.15% | 91.51% |
| | Sobol | | 93.78% | |
| 2,048 | Random | 94.73% | 95.14% | 95.40% |
| | Sobol | | 96.31% | |
| 4,096 | Random | 96.68% | 96.88% | 97.09% |
| | Sobol | | 97.05% | |
| 8,192 | Random | 97.47% | 97.68% | 97.87% |
| | Sobol | | 97.85% | |

| D | Encoding | Performance | |
|---|---|---|---|
| | | Runtime | Memory |
| 8,192 | Random | 1,068.3 sec | 18.3 KB |
| | Sobol | 687.4 sec | 17.8 KB |

FIGURE 3

| | *Accuracy* | Minimum | Average | Maximum |
|---|---|---|---|---|
| *1K* | Baseline HDC | 70.65% | 79.09% | 84.89% |
| | Our Proposal | | 83.36% | |
| *2K* | Baseline HDC | 71.81% | 81.29% | 86.96% |
| | Our Proposal | | 85.68% | |
| *8K* | Baseline HDC | 86.19% | 87.27% | 87.51% |
| | Our Proposal | | 87.60% | |

| Performance - Embed. | | Run-time | Dyn. Mem. |
|---|---|---|---|
| 1K | Baseline HDC | 0.701 sec | 8496 KB |
| | Our proposal | 0.016 sec | 816 KB |
| 8K | Baseline HDC | 5.938 sec | 52 401 KB |
| | Our proposal | 0.058 sec | 2220 KB |

| Code Mem. |
|---|
| Baseline |
| 13.2 KB |
| Ours |
| 8.2 KB |

FIGURE 10

| $D$ | 1K | 2K | 8K |
|---|---|---|---|
| Sobol + VDC | 85.10% | 87.12% | 88.68% |
| Halton + VDC | 82.33% | 86.48% | 88.30% |

FIGURE 11

| Seq. | Area ($\mu m^2$) | Power ($\mu W$) | Latency (ns) |
|---|---|---|---|
| Sobol | 1562 | 24.64 | 0.68 |
| Halton | 580 | 50.45 | 1.06 |
| VDC | 163 | 16.05 | 0.49 |

FIGURE 12

METHOD AND SYSTEM FOR ENCODING IMAGE DATA IN HYPERDIMENSIONAL COMPUTING SYSTEMS

CROSS-REFERENCE TO RELATED APPLICATIONS

This application claims priority to U.S. Provisional Application No. 63/530,034 titled "Method for Improved Hypervector Encoding", filed on Jul. 31, 2023, and U.S. Provisional Application No. 63/661,167 titled "Method and Architecture for Encoding Image Data in Hyperdimensional Computing Systems", filed on Jun. 18, 2024.

STATEMENT REGARDING FEDERALLY SPONSORED RESEARCH OR DEVELOPMENT

This application was supported in part by National Science Foundation grants #2127780, #2019511 and #2339701, SRC Global Research Collaboration, AIHW and HW Security, Department of the Navy, Office of Naval Research, grant #N00014-21-1-2225 and #N00014-22-1-2067, and the Air Force Office of Scientific Research, grant #22RT0060.

REFERENCE TO A "SEQUENCE LISTING," A TABLE, OR A COMPUTER PROGRAM

Not applicable.

FIELD OF THE INVENTION

The field of the dimension relates to hyperdimensional computing, namely using low-discrepancy sequences to perform high quality encoding of hypervectors in hyperdimensional computing to conducting image processing.

BRIEF DESCRIPTION OF THE DRAWINGS

The drawings constitute a part of this specification and include exemplary embodiments of the invention disclosed herein, which may be embodied in various forms. It is to be understood that in some instances, various aspects of the invention may be shown exaggerated or enlarged to facilitate an understanding of the invention. Therefore, the drawings may not be to scale.

FIG. 3 provides a table of the performance results.

FIG. 10 is a table comparing the inference runtime and memory allocation per image of currently known HDC to the disclosed HDC system for the different dimensions of 1K and 8K HDCs.

FIG. 11 is a table comparing the accuracies of hybrid sequences using MNIST.

FIG. 12 is a table comparing the hardware cost of two hypervector generations with D=256.

BACKGROUND OF THE INVENTION

Unconventional data representations using long binary sequences in the form of stochastic bit-streams, unary bit-streams, and hypervectors have come to the fore of the emerging computing technologies in the last decade. Unlike conventional binary radix representation, these binary sequences assign equal weight to all bits independent of their positions. Such holographic representation provides robustness to soft errors (i.e., bit flips), as any single-bit fault can lead to only a least significant bit error. It also realizes complex computations using simple hardware-friendly operations. Hyperdimensional computing (HDC) is an artificial intelligence computing methodology that mimics brain-like learning with highly efficient and noise-tolerant computation. HDC emulates the structure of the brain's signals to achieve single-pass learning. HDC operates on long-dimensional vectors called hypervectors. The hypervectors are constructed as long bit-streams and form the basic building blocks of HDC systems. In HDC, hypervectors are generated from scalar values without taking their bit significance into consideration. HDC has been shown to be efficient and robust in various data processing applications, including computer vision tasks.

Figure 1:
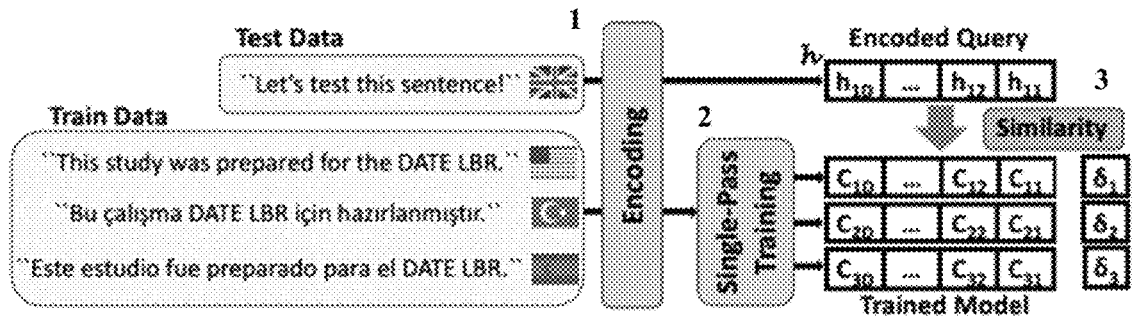
FIG. 1 provides an overview of a hyperdimensional computing (HDC) system set-up currently known in the art comprising the encoding, training, and similarity check functionalities for machine learning models.

Since the primitive operations in HDC are in the order of logic gates and depend on hardware-light solutions such as XORing, shifting, dot product, and population count, HDC are a promising alternative to complex systems such as deep learning in resource-limited environments. In HDC systems, the primitive data unit is a vector consisting of +1 (logic-1 in memory) and −1 (logic-0 in memory) values. Up to 10,000 bit long hypervectors are used when encoding data 1 (see FIG. 1). During training, as shown in the high level diagram of FIG. 1, HDC superimposes the encoding of signal values to create a composite representation of a phenomenon of interest known as a "class (C) hypervector" 2. During the inference, the nearest similarity (d) search returns the class of the encoded query hypervector 3 (FIG. 1).

With an analogy to the traditional machine learning (ML) systems, HDC provides efficiency with simple arithmetic operations, noniterative learning, optimization-less model tuning, and small model size. In conventional neural networks (NNs), three basic operations are utilized for the forward pass of the learning phase: 1) multiplication; 2) addition; and 3) activation. The basic operations in HDC are multiplication, also known as binding ($\oplus$: logical XOR), addition or accumulation ($\Sigma$: bitwise population count), and permutation ($\Pi$: shifting) or binarizing during model obtainment with a comparator. These operations are invertible and have linear time complexity. While HDC ends up with a final model after these fundamental operations, conventional ML with NNs needs optimization over an error check using operation-intensive partial derivatives and model updates. The HDC models consist of binary sequences of $-1$s and $+1$s, building each class with D-size hypervectors instead of positional weights in matrices linking loads of neurons in the consecutive layers.

HDC systems first encode data with a proper technique according to the classification or cognitive tasks. Spatial, temporal, and histogram-based encoding techniques are used in the literature. For image classification, the current HDC systems encode image data using pixel intensities and the corresponding positions (assuming that the system operates on 2-D grayscale images). Encoders are divided into (i) record-based and (ii) n-gram-based approaches. The record-based approaches assign level hypervectors (L, e.g., pixel intensity values) and position hypervectors (P, e.g., randomly generated vectors for pixel positions). Since the pixel intensities are numerical values, closer numbers have similar vector encoding. For D-dimensional vectors, n-bit grayscale intensity representation conforms hypervectors between D-sized $L_0=000 \ldots 00_D$ (full of logic-0s, i.e., $-1$s) and $L_2{}^n=111 \ldots 11_D$ (full of logic-1s, i.e., $+1$s). A random bit-flipping approach is utilized starting from the first level hypervector, $L_0$. At each level, $k=(D/2^n)$ bits are randomly flipped ($0 \leftrightarrow 1$ flip). On the other hand, each pixel's position is considered in a 2-D (x, y) image matrix. Since positions are not numerical values, each coordinate is represented with a symbolic assignment of random hypervectors. Feature positions on data are encoded via $P_S$ that are orthogonal to each other. Any pixel position, $(x_i, y_j)$, has a global representation of $P_{i,j}$, valid for training or inference images. On the contrary, level hypervectors are expected to have correlations between neighbors. Each P has 50% logic-1s and 50% logic-0s. After encoding pixel and position hypervectors, the final encoded image is obtained by multiplying and accumulating the values of $L_S$ and $P_S$:

$$\mathcal{H} = \sum_{i=1}^{N} (L_i \oplus P_i),$$

where N is the image size (row×column). The second category uses n-gram-based statistics like those in natural language processing systems. These encoders use rotationally permuted hypervectors is $\mathcal{H} = L_1 \oplus \pi L_2 \oplus \pi^{N-1} L_N$, where $\pi^n$ denotes the n-times rotationally permuted L.

In HDC systems with non-continuous data, hypervectors preferably are orthogonal to each other. Randomly generated vectors are nearly orthogonal. Generally, pseudo-random methods are utilized to provide this randomness. However, this directly affects the accuracy and may require hundreds to thousands of rounds to determine the best random vectors. Hypervector optimization may not always be possible and can affect the performance if the training phase is performed on edge devices.

SUMMARY OF THE INVENTION

Disclosed herein is a novel method for high quality encoding of hypervectors in hyperdimensional computing by implementing low-discrepancy (LD) sequences. The new encoding technique may allow for highly-accurate classification with a single-time training step without the need for multiple rounds of randomization. Tests conducted in an embedded environment show a significant improvement in classification accuracy, potentially up to 9.79% compared to the conventional random hypervector encoding.

Competing products and prior art have predominantly focused on using pseudo-random methods for hypervector encoding, which can only provide near orthogonality. Due to the random behavior of the prior art, multiple rounds of experimentation are required to generate hypervectors with different distributions and to achieve the best validation accuracy. So the traditional encoding methods require an iterative refinement procedure. In contrast, the disclosed method uses a deterministic encoder that works in a single iteration, resulting in faster runtime and higher classification accuracy. Instead of pseudo-randomness, the disclosed method uses quasi-random or low-discrepancy sequences for encoding hypervectors.

The hypervector encoding methodology is then applied to encoding image data in HDC systems. The method utilizes low-discrepancy sequences, such as Sobol (S), Halton, or Van Der Corput (VDC) sequences, for deterministic encoding of the image intensity values. Instead of encoding, the method uses the corresponding index of any sequence (e.g., Sobol $S_i$) ranging from $S_1$ to $S_{row \times column}$. Finally, the image hypervector formula becomes $$\mathcal{H} = \sum_{i=1}^{N} (L_i).$$

Experimental results on an image classification HDC system show the proposed encoding technique reduces the inference runtime by 102× with 8K vector dimensions for the MNIST dataset. The accuracy of the proposed method surpasses the baseline and currently known approaches for the CIFAR-10 dataset.

Current HDC systems provide orthogonality by generating pseudo-random hypervectors. The best random vectors are selected over iterations for the best performance. The developed hypervector encoding technique uses LD sequences that is deterministic and highly accurate and does not need any iteration. Generating two distinct hypervector data structures (P and L) and applying logical processing (XOR, multiplication) on them can be very time and energy consuming. As an important advantage, the disclosed method operates on a single hypervector data, L. We further propose a hybrid technique for generating hypervectors by combining different types of deterministic sequences instead of a single type, providing a higher classification accuracy. Our technique relies on LD sequences, initially employed for stochastic computing (SC), and extends their application to HDC. Unlike other methods described in the art, a plain HDC can be applied without any additional optimization techniques.

Figure 4:
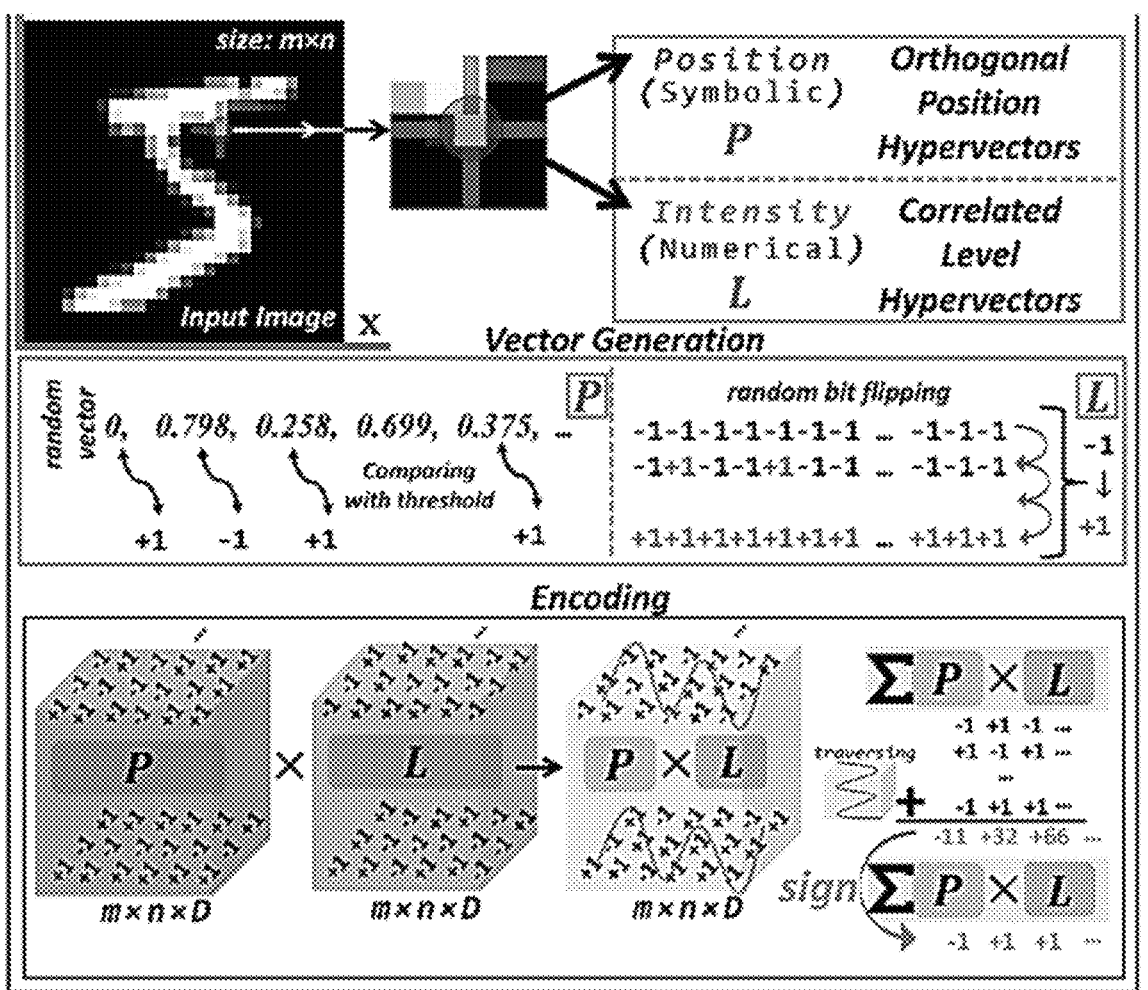
FIG. 4 provides a rendering of the process currently known in the art of conducting image hypervector encoding for cognitive tasks of HDC comprising conventional position-based encoding.

FIG. 4 shows the traditional hypervector encoding for image hypervectors (baseline HDC). Ps are generated by comparing the random numbers with a threshold value of 0.5. This is an unbiased value to produce an equal number of $+1$s and $-1$s in each hypervector, thereby having better orthogonality. Level hypervector generation is based on bit flipping. The generated hypervectors are then multiplied element-wise (bit-wise XOR in hardware). To accumulate the multiplied hypervectors ($L \oplus P$) coming from each pixel, positions are traversed. Hypervectors are added to each other again by element-wise processing (bit-wise popcount in hardware). The final values are evaluated for class hyper-vector, and binarization is performed via sign function (thresholding with comparator in hardware). For each class in training, data are processed to contribute to the corresponding class hypervector. In inference, each query image from the test set is evaluated for the same encoding steps, and the obtained query hypervector is compared with each class' trained hypervectors, e.g., using cosine similarity. The highest similarity is the classification result.

Figure 5:
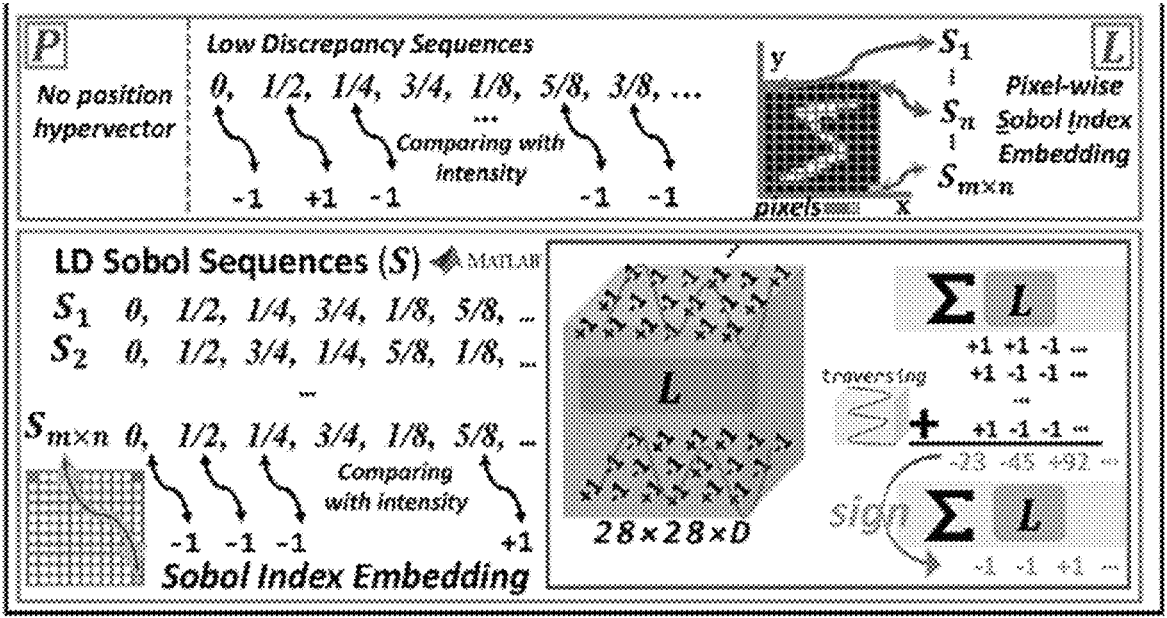
FIG. 5 provides a rendering of the disclosed image hypervector encoding for cognitive tasks of HDC using low discrepancy Sobol sequences to alleviate position-based operations.

FIG. 5 shows the disclosed image processing encoding technique. The disclosed method radically changes the encoding in cognitive HDC systems by alleviating their operations. Any pixel intensity is encoded based on the pixel position corresponding to the LD sequence index; as exemplified in FIG. 5 with Sobol sequences. The normalized intensity value (by D) is compared with each element in the corresponding Sobol sequence. If the normalized intensity is greater than the Sobol random number, the hypervector position gets +1; otherwise, it gets −1. After obtaining L, the method performs the accumulation without the multiplication step of the encoding.

DETAILED DESCRIPTION OF THE INVENTION

The disclosed method uses Sobol sequences for high-quality hypervector encoding. The new encoding approach is lightweight and does not require an exhaustive search to find the best-performing vectors, yielding efficient training on edge devices. Sobol-based bit-stream generators also come with a lightweight hardware design.

Figure 2A:
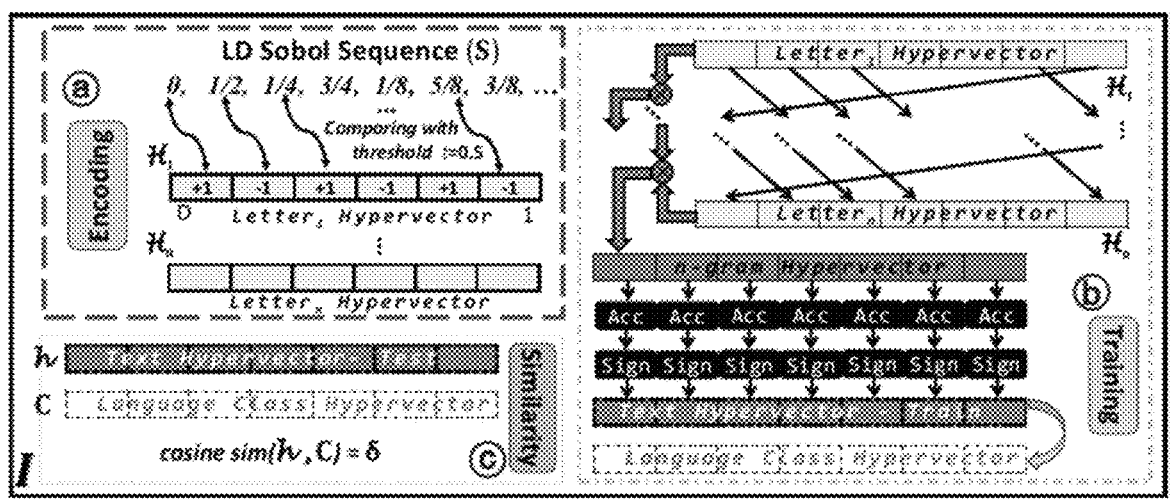
FIG. 2A depicts an example of hypervector generation with MATLAB®'s first Sobol sequence.

This work utilizes Sobol sequences in vector encoding of HDC systems. The method may utilize any readily available Sobol sequence (e.g., in MATLAB via sobolset( ) point set) with a D dimension ($S_D \in [0,1]$) can be considered an array with pre-allocated quasi-random numbers. For each $i^{th}$ hypervector position, S is compared with a threshold value (t). If $t > S_i$, the vector value at the $i^{th}$ position is +1; otherwise, it is −1. In the preferred embodiment of an HDC system with pseudo-random nearly orthogonal vectors, t is 0.5. FIG. 2A depicts an example of a hypervector generation with MATLAB's first Sobol sequence.

After encoding hypervectors, the next step is training. Considering a letter processing example, every n-character block in the training dataset is subject to multiplication (XOR), permutation (shifting), and cumulative addition (popcount) over previously encoded hypervectors (uniquely assigned to each other). The accumulated values (Acc) are binarized at each vector position using the Sign function. The class hypervector of each language is obtained after a complete scan of the dataset for that class. For test set classification accuracy, the text hypervector obtained for each query is compared with the class hypervector as seen in FIG. 2A.

Figure 2B:
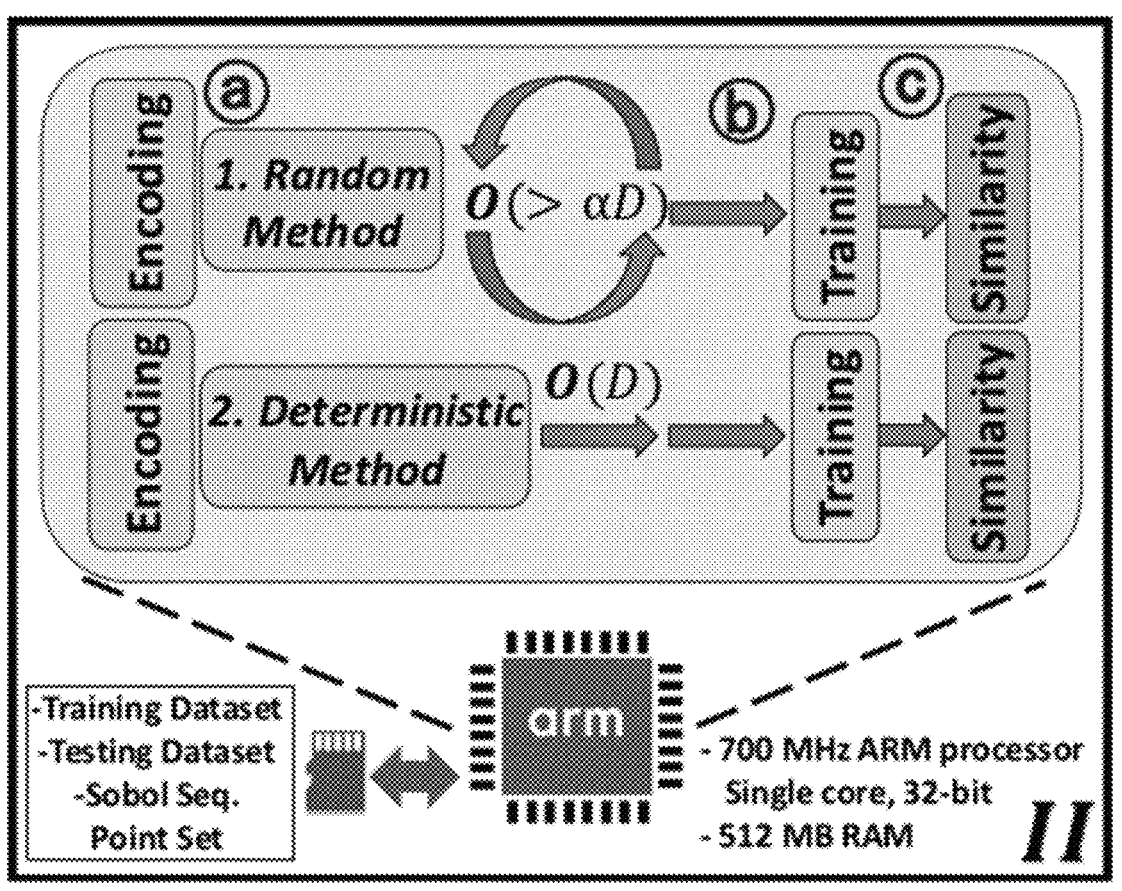
FIG. 2B illustrates deploying the HDC system to an ARM processor for training and inference to demonstrate edge device compatibility.

FIG. 2B illustrates the process of deploying an HDC system to an ARM processor for training and inference to prove edge device compatibility. In the preferred embodiment, a 700 MHz, 32-bit, single-core ARM processor runs the HDC system implemented in C language. The applicants evaluated two encoding methods: 1) the conventional random approaches and 2) the deterministic approach based on Sobol sequences. For optimization, the random method generates different letter hypervectors in rounds of a times, consuming a runtime of O ($>\alpha D$) complexity. The random method dynamically creates data with a built-in C language-based r and function. On the other hand, the Sobol sequences are pre-generated, stored in, and read from memory.

First evaluated is the accuracy and speed of the two approaches. The testing uses the 21-class European language dataset to train the HDC system and the Europarl Parallel Corpus dataset for the inference. The selected n-gram was four decided by iterating over $n \in \{2,3,4,5\}$ for its outperformance. FIG. 3 shows the classification accuracy of the two encoding approaches. For the random approach, $\alpha$ is selected as 1:1:1000 iteratively, and the average classification accuracy is reported over 1,000 independent runs. For this approach, also reported are the minimum and maximum accuracy values. As can be seen in FIG. 3, the proposed encoding outperforms the conventional random approach by bringing better uncorrelated hypervectors for all D sizes. The best accuracy values are achieved with the proposed encoding. Compared to the state-of-the-art HDC language classification (D=10,000, n=4, accuracy=97.1%), the Sobol-based approach improves the classification rate by 0.75% when D=8,192.

FIG. 3 also presents the performance (i.e., run-time and memory usage) results. Training on the edge device was performed with hypervectors of length D=8,192. Encoding methods were tested independently. Runtime comparison was performed for single-time hypervector assignment for a fair comparison ($\alpha=1$ for the random approach and Sobol-based encoding always works with a single iteration). As can be seen, the disclosed method achieves a better runtime. It should be noted that the random method needs to be run iteratively to achieve comparable accuracy with the proposed encoding. Therefore, even though the random numbers are pre-stored like in Sobol (for better runtime), multiple runs are required for better orthogonality and so higher accuracy. Moreover, if new symbols are added to the HDC system, new hypervector generations need further optimizations. The disclosed method, however, loads and uses only an additional Sobol sequence, thus providing a dynamic architecture.

The disclosed encoding method alleviates the training step in currently known HDC systems. Without using any pre-optimization or exhaustive search for best-performing hypervectors, Sobol-based encoding yields promising accuracy and performance results. Considering the recent efforts on in-memory computing-based HDC systems, deployment of full training into emerging platforms is challenging. Utilizing a single-read operation for hypervector encoding, as disclosed herein, shows promising results for developing fast and edge-compatible HDC systems.

Having now applied the single-read operation for hypervector encoding for HDC systems, now disclosed is using low discrepancy sequences to process images. The disclosed method encodes image data solely based on pixel intensities, eliminating the need for encoding pixel positions. This invention introduces a radically new approach to encode image data solely based on pixel intensities, eliminating the need for encoding pixel positions. This is achieved by utilizing low-discrepancy (LD) sequences, such as Sobol or Van Der Corput (VDC) sequences, for deterministic encoding of the image intensity values. The position hypervectors, which were previously required for representing pixel positions, are no longer needed. The corresponding index of the LD sequence is used to encode the intensity values. The invention significantly reduces the computational complexity of HDC systems by eliminating position hypervectors and removing the multiplication operations associated with them.

Figures 8, 9:
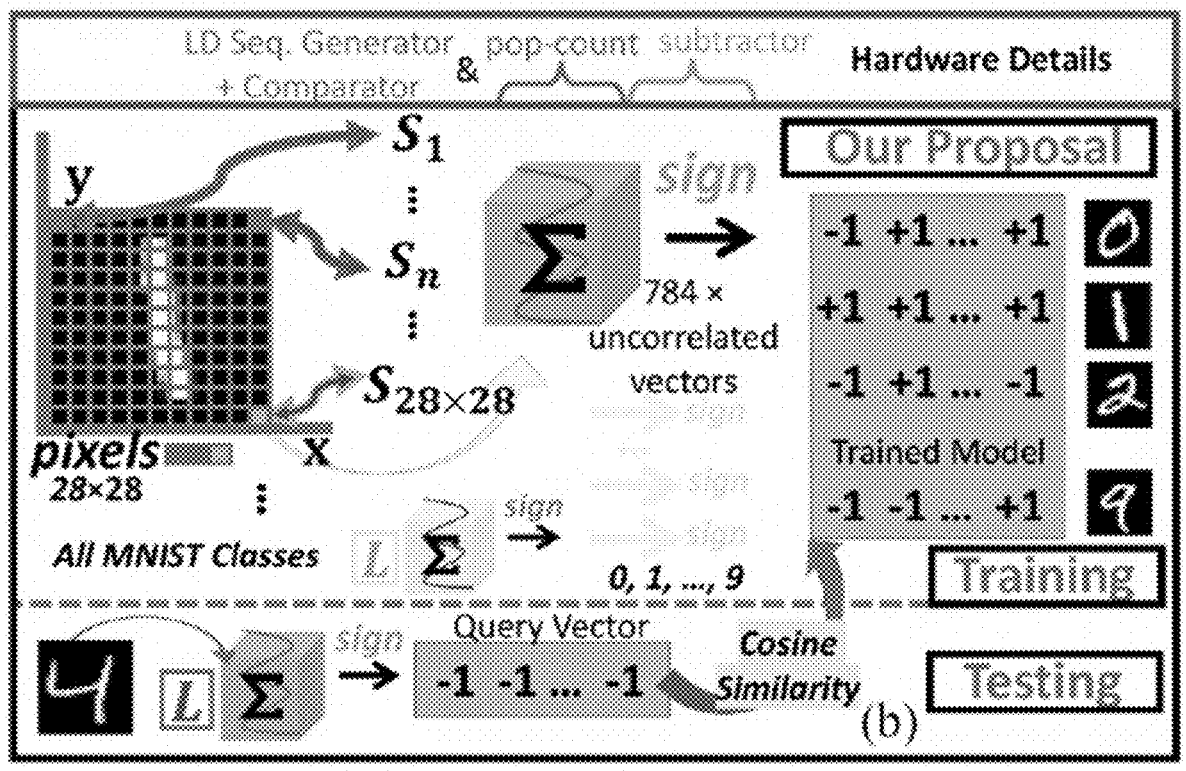
FIG. 8 provides the process of training and testing the disclosed inventive HDC system utilizing MNIST and CIFAR-10 with 8-bit grayscale images.
FIG. 9 is a table comparing the accuracies of currently known HDC to the disclosed HDC system for the different dimensions of 1K, 2K, and 8K HDCs.

Discussing each step in the image processing method with greater specificity, wherein the image to be processed comprises a plurality of pixels comprising hypervectors organized in a m×n orientation, the first step in HDC comprises mapping each image data point into high-dimensional space. As shown in FIG. 5 and FIG. 8, $L_S$ may be generated using preferably LD sequence generators. In the preferred embodiment, $L_S$ may be directly used for bundling (via pop-counters). Thresholding (or subtraction) can be used for the sign. These actions may be performed in a HDC system comprising a LD sequence generator, comparator, pop-counter, and a subtractor.

As shown in FIG. 5, LD sequences are generated using an LD sequence generator. Those LD sequences each corresponded to a specific pixel location in the image. For each pixel, each LD sequence may further be compared with a normalized pixel intensity, wherein each normalized pixel intensity is generated using any known method in the art. If the normalized intensity is greater than the Sobol random number, then the hypervector position for that pixel may be assigned a +1. If the normalized intensity is less than the Sobol random number, then the hypervector position for that pixel may be assigned a −1. After obtaining L, the hyper-vectors are accumulated without performing a multiplication step, as in those encoders currently known in the art. The final encoded image comprises $$\mathcal{H} = \sum\nolimits_{i=1}^{N} (L_i).$$

In addition to Sobol sequences, explored are two high-quality LD random sequences, Halton and VDC, for HDC encoding. The discrepancy term in LD refers to the deviation from uniformity within the sample space. Thus, high orthogonality is expected by using LD sequences, and the HDC system can benefit from them. The VDC sequences play a fundamental role and serve as the foundation for some other LD sequences, such as Halton sequences. Generally, each VDC sequence is constructed by reflecting the digit values of a given number with respect to the radix point for a base-B number and then representing the resulting number within the (0, 1) interval. This can be realized efficiently in hardware.

The HDC system may require many random sequences for the encoding stage. For instance, the number of needed random sequences may correspond to the number of image pixels. Due to the limitation in the number of available LD sequences in some tools (e.g., MATLAB has 1111 built-in Sobol sequences and Python has 21201 different sequences), we also explore the case of using different types of sequences (e.g., Sobol+VDC).

Figure 7:
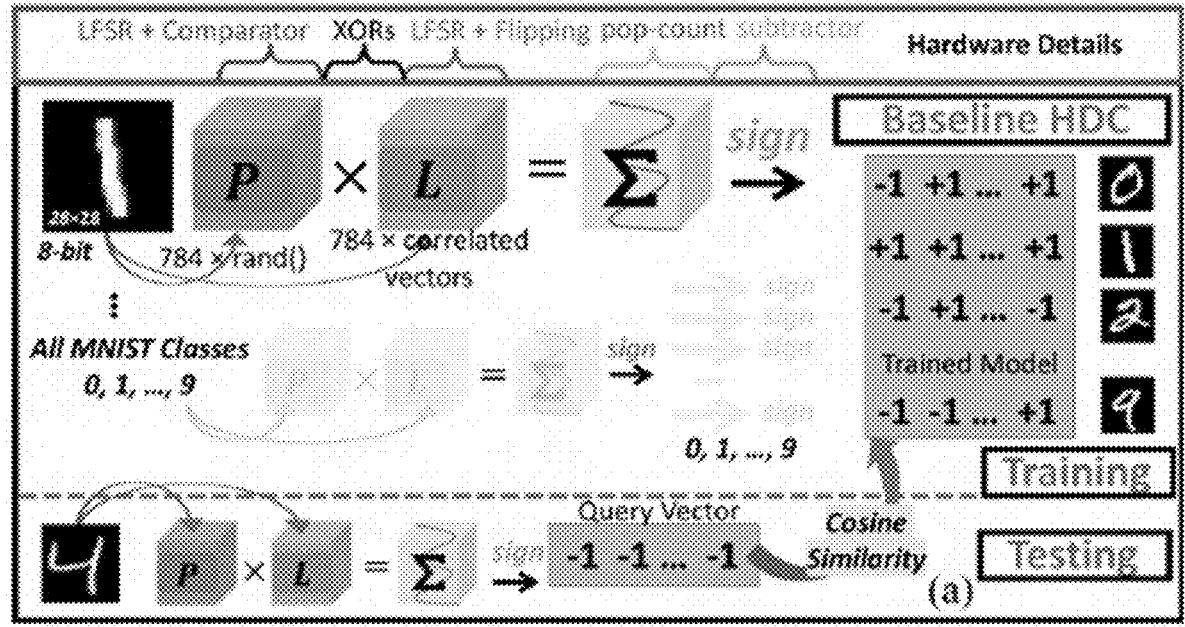
FIG. 7 provides the process of training and testing a baseline HDC as known in the art utilizing MNIST and CIFAR-10 with 8-bit grayscale images.

FIG. 7 presents the overall structure of the baseline HDC model, and the proposed method (FIG. 8) considering the training and testing phases. The baseline HDC is constructed without the assistance of retraining or NN. During the training phase, the P and L hypervectors are generated using pseudo-random methods, e.g., linear-feedback shift register constructs. The results are then multiplied by XOR operations and then processed through pop-counting operations. The binarized results, obtained through subtraction, are stored as models for each input. The same procedure is applied during the testing phase, where the resulting binary hypervector is compared with the stored hypervectors using cosine similarity. In contrast, the proposed method in FIG. 8 only utilizes the L hypervectors and does not involve the P hypervectors. We evaluate the accuracy of these models with the MNIST and CIFAR-10 datasets, consisting of 50K images for training and 10 K for testing.

Figure 6:
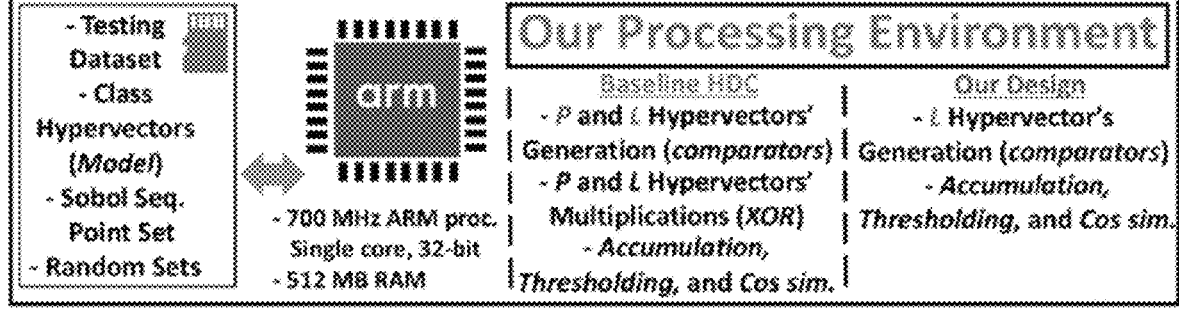
FIG. 6 provides information on the deployment procedure and processing environment to practice the disclosed image hypervector encoding for cognitive tasks of HDC using low discrepancy Sobol sequences to alleviate position-based operations.

FIG. 6 shows the details of our processing environment. We evaluate the performance of the proposed technique on an embedded platform (700-MHz ARM-based) with limited hardware resources. We first utilize the MNIST dataset for the classification task and compare the performance of the baseline and the proposed encoding technique (when using Sobol sequences) for accuracy, runtime, and memory usage.

FIG. 9 compares the accuracy for different dimensions of 1K, 2K, and 8K with the known HDCs. For the baseline HDC, the training and testing are performed 100 times to report minimum, maximum, and average classification accuracy. Since our approach is free from randomness, it completes in a single iteration. As can be seen, the proposed encoding achieves a higher accuracy than the average and minimum accuracy of the baseline encoding for all dimensions. We also compare the inference runtime per image, as seen in FIG. 10. We can see that the proposed technique reduces the runtime by 43× for 1K and 102× for 8K. The memory usage is also reduced by 10.4× for 1K and 23.6× for 8K when using the proposed technique.

To further explore the LD sequences, we utilize hybrid combinations of Sobol+VDC and Halton+VDC sequences. These increase the design space by increasing the indexes derived from merged sequences. We observed that the combined usage of Sobol and VDC sequences results in better outcomes than using the Sobol sequences alone. This enhancement can be attributed to the perfect interorthogonality between the sequences and their intraorthogonality. FIG. 11 presents the accuracy results from the classification of the MNIST dataset.

In addition to evaluating the performance of our encoding technique on an embedded system, we compare the hardware ASIC costs of the proposed hypervector generators. FIG. 12 reports the hardware cost of three hypervector generation methods using the Synopsys Design Compiler v2018.06 and the 45-nm FreePDK gate library. The VDC sequence generator design employs a simple $\log_2$D-bit counter to generate sequence values for a specific base of D, assuming that D is a power of 2. This sequence generator benefits from its simplicity and lightweight design, and as it can be seen, provides approximately 3.5× and 9.58× greater area efficiency compared to the Halton sequence generator and Sobol-based design, respectively. In terms of power consumption, the VDC design is approximately 3.14× and 1.53× more efficient than the Halton and Sobol sequence design, respectively.

This study presents a novel encoding method to enhance the accuracy and minimize the runtime and memory usage of hypervector generation and processing in cognitive HDC systems. We leverage deterministic LD sequences, which offer a fast and precise hypervector encoding approach. Our experimental findings showcase a remarkable 102-fold reduction in runtime and a 23.6-fold decrease in memory usage when employing the proposed technique, compared to the conventional HDC encoding, particularly in embedded environments. Furthermore, we explored utilizing various deterministic sequences and evaluated their impact on accuracy and low-level hardware performance.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

Moreover, the terms "substantially" or "approximately" as used herein may be applied to modify any quantitative representation that could permissibly vary without resulting in a change to the basic function to which it is related.

We claim:

1. A method for encoding an image data comprising the following steps:
   (a) providing hyperdimensional computing system comprising:
      a low-discrepancy sequence generator;
      a comparator;
      a pop-counter;
      a subtractor; and
      a memory;
   (b) identifying the image data to be encoded, wherein the image data comprises a plurality of pixels;
   (c) generating a low-discrepancy sequence by the low-discrepancy sequence generator, wherein the low-discrepancy sequence comprises a plurality of numbers;
   (d) for each pixel of the image data, identifying a normalized pixel intensity;
   (e) comparing each number of the low-discrepancy sequence to a corresponding normalized pixel intensity value for each pixel, wherein:
      (i) if the normalized pixel intensity is greater than a corresponding number of the low-discrepancy sequence, a hypervector position of said pixel is assigned a +1; and
      (ii) if the normalized pixel intensity is less than a corresponding number of the low-discrepancy sequence, a hypervector position of said pixel is assigned a −1;
      (iii) repeating the above-described comparison for all pixels in the image data;
   (f) accumulating the hypervector positions from the pixels; and
   (g) saving a final encoded image data to the memory.

2. The method of claim 1, wherein the low-discrepancy sequences comprise one or more Sobol sequences.

3. The method of claim 1, wherein the low-discrepancy sequences comprise one or more Halton sequences.

4. The method of claim 1, wherein the low-discrepancy sequences comprise one or more Van der Corput sequences.

5. The method of claim 1, wherein the low-discrepancy sequences comprise a combination of two or more of the following:
   Sobol sequences;
   Halton sequences; and
   Van der Corput sequences.

6. The method of claim 1, wherein the steps for encoding the image data are conducted using an ARM-based embedded computing platform.

7. The method of claim 1, wherein the low-discrepancy sequence generator comprises a $\log_2 D$-bit counter.

8. The method of claim 1, wherein the comparison is performed using a cosine similarity process.

9. A system comprising at least one computing device comprising:
   a low-discrepancy sequence generator;
   a comparator;
   a pop-counter;
   a subtractor; and
   a memory;
   wherein the computing device is configured to:
      receive image data comprising a plurality of pixels, wherein each pixel comprises a normalized pixel intensity value;
      compare one or more low-discrepancy sequence values generated by the low-discrepancy sequence generator to a normalized pixel intensity value for each pixel;
      accumulate a hypervector position from each pixel; and
      saving a final encoded image data to the memory.

10. The system of claim 9, wherein the low-discrepancy sequence values comprise one or more Sobol sequences values.

11. The system of claim 9, wherein the low-discrepancy sequence values comprise one or more Halton sequences values.

12. The system of claim 9, wherein the low-discrepancy sequence values comprise one or more Van der Corput sequence values.

13. The system of claim 9, wherein the low-discrepancy sequence values comprise a combination of two or more of the following low-discrepancy sequences:
   Sobol sequences;
   Halton sequences; and
   Van der Corput sequences.

14. The system of claim 9, wherein the computing device comprises an ARM-based embedded computing platform.

15. The system of claim 9, wherein the low-discrepancy sequence generator comprises a $\log_2 D$-bit counter.

16. The system of claim 9, wherein the comparison is performed using a cosine similarity process.

* * * * *